United States Patent

Chaney

[15] 3,636,769
[45] Jan. 25, 1972

[54] EXPLOSIONPROOF CANDY THERMOMETER

[72] Inventor: John L. Chaney, Lake Geneva, Wis. 53147

[22] Filed: Mar. 30, 1970

[21] Appl. No.: 23,815

[52] U.S. Cl. .................................................73/371, 73/374
[51] Int. Cl. .........................................................G01k 1/12
[58] Field of Search ..........................73/371, 374, 378, 416; 206/16.5; 215/41; 220/44

[56] References Cited

UNITED STATES PATENTS

| | | | |
|---|---|---|---|
| 1,995,470 | 3/1935 | Chaney | 73/378 |
| 3,273,394 | 9/1966 | Chaney | 73/374 |
| 3,527,102 | 9/1970 | Harland | 73/416 X |
| 2,389,485 | 11/1945 | Bruns | 73/374 |
| 2,672,053 | 3/1954 | Geyer | 73/343 |
| 3,484,016 | 12/1969 | Turner | 215/41 |

Primary Examiner—Louis R. Prince
Assistant Examiner—Daniel M. Yasich
Attorney—Marechal, Biebel, French & Bugg

[57] ABSTRACT

A candy thermometer is made explosionproof by forming the outer protective tube with an open upper end which is closed by means of a plastic cap which normally is frictionally but removably held in sealing relation and which softens and distorts before the temperature and hence the pressure of the air in the tube exceed safe limits, thereby relieving the internal air pressure.

3 Claims, 3 Drawing Figures

PATENTED JAN 25 1972 3,636,769

INVENTOR
JOHN L. CHANEY

BY
Mareckal, Biebel, French & Bugg
ATTORNEYS

EXPLOSIONPROOF CANDY THERMOMETER

BACKGROUND OF THE INVENTION

A conventional candy thermometer includes a graduated scale card to which the thermometer tube is fastened and an outer protective tube so that when dipped in the candy the scale card and thermometer tube do not come in contact with the candy. The tube is usually sealed at the top and bottom to make certain that the interior of the tube is kept completely clean.

In its normal use the thermometer is clipped to the side of the cooking pan and the majority of its length is in the room atmosphere so that no undue heating occurs. However at times the thermometer is put into the oven and the oven temperature raised as a means of checking the thermostat. Thus the entire body of the thermometer under these conditions can be subjected to temperature of the order of 400° to 550° F. When this occurs there is an increase of internal pressure of the order of 1 atmosphere, i.e., from about 12 to 14 pounds per square inch. Ordinarily the tube can withstand this pressure but it it is struck or is dropped, it may shatter with explosive force.

In my prior U.S. Pat. No. 1,995,470, I disclose a candy thermometer in which the upper end of the outer tube is open, and is closed by a rubber cap. This construction does not assure an explosionproof product however because the rubber has different characteristics from the plastic cap used in the present invention. It may over a period of time undergo vulcanization such as to be firmly fastened in place, and in addition rubber has different characteristics under increase in temperature and does not function to relieve internal pressure as does the plastic material used in the present invention.

SUMMARY OF THE INVENTION

In accordance with the present invention the open upper end of the protective tube of a candy thermometer is closed by a plastic cap which fits sufficiently securely during the normal use of the thermometer to fully protect the interior against entrance of any foreign matter but which is of such character that it will soften as the temperature approaches the boiling point and thus will relieve the internal pressure before it exceeds safe limits, thus rendering the thermometer explosionproof.

DESCRIPTION OF THE PREFERRED EMBODIMENT

Figure 1:
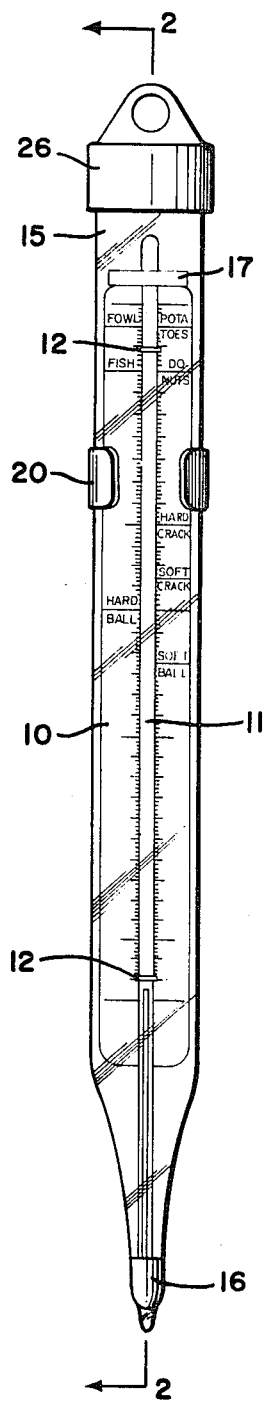
FIG. 1 shows a front view of the thermometer in accordance with the present invention.
Figure 2:
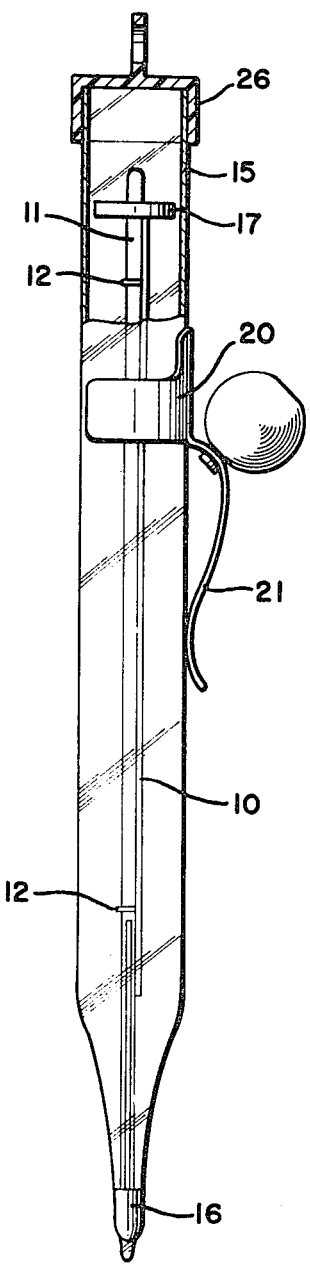
FIG. 2 is a side view with the upper portion of the protective tube and the cap being shown in section on the line 2—2 of FIG. 1.

FIG. 1 of the drawing shows the graduated scale card 10 on which the thermometer tube 11 is mounted by means of fasteners 12. The card and thermometer are enclosed in an outer protective tube 15 with the bulb of the thermometer extending down to the lower end of the tube in good heat conducting relationship with a metal cap 16 at the lower end. A disk 17 is mounted on the upper end of the scale card to maintain the scale card and thermometer tube in a central position within the outer tube.

A spring clip 20 is slidably received on the outer surface of the tube 15 and includes a spring arm 21 to fasten the thermometer in upright position over the edge of a cooking pan.

Figure 3:
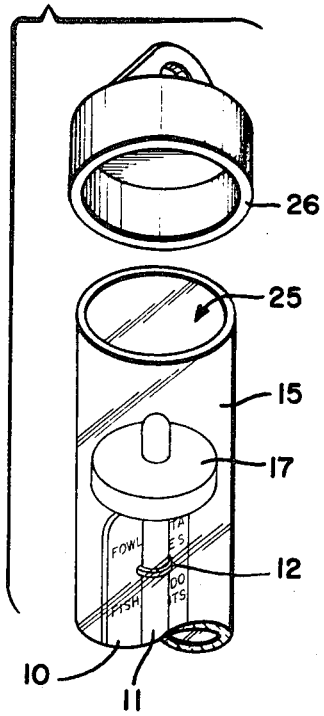
FIG. 3 is a view in perspective on a larger scale of the upper end of the thermometer showing the cap removed.

The upper end of tube 15 is open as shown at 25 in FIG. 3 and a cap 26 is adapted to be frictionally received over the open end. Cap 26 is made of plastic material of the thermoplastic type such as polyethylene and is selected so that while it fully protects and seals the end of the tube under normal atmospheric temperature conditions, it will, when heated to a temperature approaching the boiling point of water, soften and distort enough to allow escape of air pressure developed within the tube. Polyethylene for example can be used advantageously which softens at 180° F. and which will actually melt at a temperature approaching 250°. Thermosetting materials or elastomers of the rubber-type either do not distort or seal more tightly to the tube; other thermoplastic materials which may be used are polyolefines such as polypropylene and copolymers thereof or mixtures thereof. Also, while the device has been referred to as a candy thermometer its use is not limited to candy, as it may equally well be used for deep fat and other types of cooking carried out in a pan.

In normal operations such temperatures are never encountered but in some cases the user may want to check the calibration of the oven thermostat and when this occurs the entire thermometer is placed in the oven. If the temperature of the oven is raised toward 400°–550° F., a substantial pressure of the order of 12 to 14 pounds per square inch would develop in the tube if the tube remained sealed. However with the thermometer of the present invention, before such temperature is reached, the plastic cap will have softened enough to relieve the internal air pressure and thus no matter how high it is heated, it is rendered explosionproof.

While the form of device herein described constitutes a preferred embodiment of the invention it is to be understood that the invention is not limited to this precise form and that changes may be made therein without departing from the scope of the invention which is defined in the appended claims.

What is claimed is:

1. An explosionproof candy thermometer capable of being heated in an oven up to of the order of 400°–550° F. without danger of exploding even if struck or dropped, comprising a graduated scale card, a thermometer tube fastened in place on said scale card and having a heat-sensitive bulb at its lower end, a protective glass tube enclosing said card and said thermometer tube, said protective tube having a closed bottom end in close heat transmitting relation with said thermometer bulb and having an open top end, and a cup-shaped plastic cap of thermoplastic material closing said open top end and being frictionally received on the outer surface of the upper end of said tube in normally sealing relation, said cap having the capacity of softening and distorting under heating of the tube thereby relieving internal air pressure in the tube before such pressure exceeds safe limits.

2. A thermometer as defined in claim 1 in which the plastic is polyethylene.

3. A thermometer as defined in claim 2 in which the plastic material is one which will soften at an elevated temperature approaching the boiling point of water.

* * * * *